(12) United States Patent
Herden

(10) Patent No.: US 6,912,991 B2
(45) Date of Patent: Jul. 5, 2005

(54) METHOD, COMPUTER PROGRAM AND CONTROL AND/OR REGULATING APPLIANCE FOR OPERATING AN INTERNAL COMBUSTION ENGINE, AND CORRESPONDING INTERNAL COMBUSTION ENGINE

(75) Inventor: Werner Herden, Gerlingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/467,527

(22) PCT Filed: Feb. 4, 2002

(86) PCT No.: PCT/DE02/00394

§ 371 (c)(1), (2), (4) Date: Aug. 8, 2003

(87) PCT Pub. No.: WO02/063155

PCT Pub. Date: Aug. 15, 2002

(65) Prior Publication Data

US 2004/0040534 A1 Mar. 4, 2004

(30) Foreign Application Priority Data

Feb. 8, 2001 (DE) .......................... 101 05 755

(51) Int. Cl.$^7$ .................................. F02B 5/02
(52) U.S. Cl. ...................... 123/299; 701/105; 123/483; 123/490
(58) Field of Search .................. 123/295, 299, 123/483, 490; 701/105

(56) References Cited

U.S. PATENT DOCUMENTS

| 4,579,096 A | * | 4/1986 | Kobayashi et al. | ......... 123/299 |
| 5,168,846 A | * | 12/1992 | Paul et al. | ................... 123/299 |
| 5,280,773 A | | 1/1994 | Henkel | |
| 6,112,721 A | * | 9/2000 | Kouketsu et al. | ........... 123/447 |
| 6,705,277 B1 | * | 3/2004 | McGee | ...................... 123/299 |

FOREIGN PATENT DOCUMENTS

| DE | 196 39 172 | 4/1998 |
| EP | 0 786 592 | 7/1997 |
| EP | 0 849 459 | 6/1998 |
| EP | 1035314 A2 * | 9/2000 |

* cited by examiner

Primary Examiner—Erick Solis
(74) Attorney, Agent, or Firm—Walter Ottesen

(57) ABSTRACT

An internal combustion engine (10), especially of a motor vehicle, is operated with a method wherein the fuel is injected directly into a combustion chamber (12) of the internal combustion engine (10) with at least one injection (36) per work cycle. In order to reduce the fuel consumption and to improve the emission performance of the internal combustion engine (10), it is suggested that a fuel injection (36) includes a plurality of short injection pulses (32) spaced in time from each other.

15 Claims, 3 Drawing Sheets

METHOD, COMPUTER PROGRAM AND CONTROL AND/OR REGULATING APPLIANCE FOR OPERATING AN INTERNAL COMBUSTION ENGINE, AND CORRESPONDING INTERNAL COMBUSTION ENGINE

This application is the U.S. national stage of international application No. PCT/DE 02/00394, filed Feb. 4, 2002, designating the United States.

FIELD OF THE INVENTION

The present invention relates to a method for operating an internal combustion engine, especially of a motor vehicle wherein the fuel is injected directly into a combustion chamber of the engine with at least one injection per work cycle.

BACKGROUND OF THE INVENTION

A method of this kind is known from the marketplace. The method is also known as gasoline direct injection. In this method, the fuel is injected into the combustion chamber of the engine at very high pressure via injection valves mounted directly at the combustion chamber. The engine operates cyclically. In a four-stroke internal combustion engine, a work cycle includes, for example, four work strokes.

In the known method, it was, however, determined that the total injected fuel does not always combust optimally. In some operating states of the engine, this leads to a fuel use which is still not economically optimal. Furthermore, an incomplete combustion of the injected fuel leads to hydrocarbon emissions or soot emissions. It was determined that this problem occurs more intensely in the cold state of the engine.

SUMMARY OF THE INVENTION

The present invention therefore has the task to improve a method of the kind mentioned initially herein so that the fuel use is still further optimized and the emissions are simultaneously reduced.

The task is solved with a method of the kind described above in that a fuel injection includes a plurality of short injection pulses spaced in time from each other.

The method of the invention is based on the following idea. The fuel is injected very early and in some circumstances already at the start of the downward movement of the piston in the induction phase in order to achieve homogenization, that is, a mixture of the injected fuel with the air in the combustion chamber as uniform as possible. In this phase, the pressure in the combustion chamber is relatively low and amounts typically to less than 1 bar. It was determined that, for longer opening times of the injection valve at so low a pressure in the combustion chamber, the fuel from the injection valve impinges against the wall of the combustion chamber lying opposite to the injection valve and adheres to this wall as a layer. However, a layer on the wall of the combustion chamber comprising fuel can be vaporized only with difficulty and therefore leads to a non-optimal mixture in the combustion chamber.

The duration of an individual short injection pulse of the plurality of injection pulses of a single fuel injection is considerably shorter than the total duration of the individual fuel injection. A short injection pulse is understood to mean, according to the invention, a pulse wherein only a small part of the fuel quantity, which is to be introduced with the individual injection into the combustion chamber of the engine, is actually injected. Such an injection pulse therefore distinguishes from the individual injections of double or triple injections known today.

In this way, the depth of penetration of the fuel drops in such an injection pulse. In this way, it is prevented that the fuel, which is injected into the combustion chamber with an injection pulse, impinges against the wall lying opposite to the injection valve and leads to the wall application mentioned initially herein. The shorter the duration of the injection pulse, the more it is ensured that the fuel injected in this way mixes with the air disposed in the combustion chamber and does not deposit on the wall of the combustion chamber. In the method of the invention, no continuous injection therefore takes place, rather, a pulsed injection takes place which is also characterized as a chopped injection.

In the method of the invention, the fuel injected into the combustion chamber essentially mixes completely with the air disposed in the combustion chamber. For this reason, the fuel is optimally combusted which reduces the specific fuel consumption and improves the emission performance. The deposit of the injected fuel on the wall of the combustion chamber for a cold combustion chamber wall is especially significant and this deposit occurs less or not at all in the method of the invention. For this reason, the cold start method of the internal combustion engine is improved with the method of the invention in a special way.

In a first embodiment, the fuel quantity, which gets into the combustion chamber with an injection, is adjusted at least also by the duration of the individual injection pulses. For controlling the power of the internal combustion engine, it has to be possible to adjust the total fuel quantity which is injected per work stroke into the combustion chamber. For this, the adjustment of the duration of the individual injection pulse offers a simple possibility. However, attention must be paid to the situation that the duration of a single injection pulse never reaches that duration for which the critical penetration depth is exceeded. Under critical penetration depth, that penetration depth is understood for which the injected fuel impinges on the wall of the combustion chamber lying opposite to the injection valve.

It is especially preferred to adjust the power of the internal combustion engine in that the fuel quantity, which reaches the combustion chamber with an injection, is adjusted at least also by the number of the individual injection pulses.

The method of the invention is realized in the simplest way in that the injection pulses are uniformly distributed over the entire duration of an injection. The method of the invention is likewise simple when the duration of the injection pulses does not change over the total duration of an injection. If the injection takes place during the induction phase of the piston, each component quantity of fuel, which is injected by an injection pulse, lands in a new inducted air volume which leads to advantages in the distribution of the fuel in the air in the combustion chamber.

It is, however, also possible that the time-dependent spacing between two injection pulses changes over the duration of an injection. In this way, the fact can be taken into account that the piston speed during the induction phase is not constant and therefore the air volumes, which are inducted per unit of time, also do not have the same magnitude. This means, in turn, that the fuel distribution in the air in the combustion chamber can be optimized.

It is especially preferred when the duration of the injection pulse changes over the total duration of an injection, preferably increases. This variation of the method of the invention is especially advantageous when the injection takes place not only during the induction phase but also during the compression phase of the internal combustion engine. The pressure in the combustion chamber increases during the compression phase of the internal combustion engine. For this reason, a moistening of the wall can be reliably avoided with the larger injection quantity present with a longer injection pulse.

In an especially preferred embodiment of the method of the invention, it is provided that, at the end of an injection, an individual injection pulse takes place which takes longer than the previous injection pulses of the injection. With such an injection strategy, a residual quantity can still be injected, for example, into a homogeneous lean mixture in the combustion chamber for a piston which has risen far (that is, toward the end of the compression phase of the engine). The residual quantity together with the homogeneous lean charge (which previously was introduced with a plurality of short injection pulses), generates approximately stoichiometry within the occurring mixture cloud (stratification from stoichiometric mixture cloud and homogeneous lean environment). This method has the advantage that extremely lean homogeneous basic mixtures can be completely combusted because an essential part of the combustion volume was previously combusted stoichiometrically and, in this way, the homogeneous lean environment was heated and compressed.

In a further embodiment, approximately 5 $mm^3$ fuel is injected per injection pulse and/or an injection pulse has a duration of not longer than approximately 0.5 ms. With these values, an impinging of the injected fuel against the wall of the combustion chamber lying opposite the injection valve is reliably prevented under normal operating conditions.

Finally, it is noted that several fuel injections take place per work cycle of which at least one, in turn, comprises several injection pulses. For example, it is possible to carry out an injection in the induction phase and another injection during the compression phase of the internal combustion engine. Such a procedure has advantages with respect to the knocking sensitivity of the internal combustion engine.

The present invention relates also to a computer program which is suitable for carrying out the above method when it is executed on a computer. Here, it is especially preferred when the computer program is stored on a memory, especially on a flash memory.

Furthermore, the present invention relates to a control apparatus (open loop and/or closed loop) for operating an internal combustion engine especially of a motor vehicle wherein the fuel is injected directly into the combustion chamber of the engine. In order to optimize the operation of the engine with respect to the consumption of fuel and the emission performance, it is suggested in accordance with the invention that the control apparatus (open loop and/or closed loop) is suitable for controlling (open loop and/or closed loop) the above method.

It is especially preferred when the control apparatus (open loop and/or closed loop) is provided with a computer program of the above-mentioned type.

The present invention further relates to an internal combustion engine having at least one combustion chamber and a device which injects the fuel directly into the combustion chamber. In order to improve the operational performance of this engine, especially the fuel consumption, the emission performance as well as the cold start performance, it is suggested in accordance with the invention that the engine be provided with a control apparatus (open loop and/or closed loop) of the above-mentioned type.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
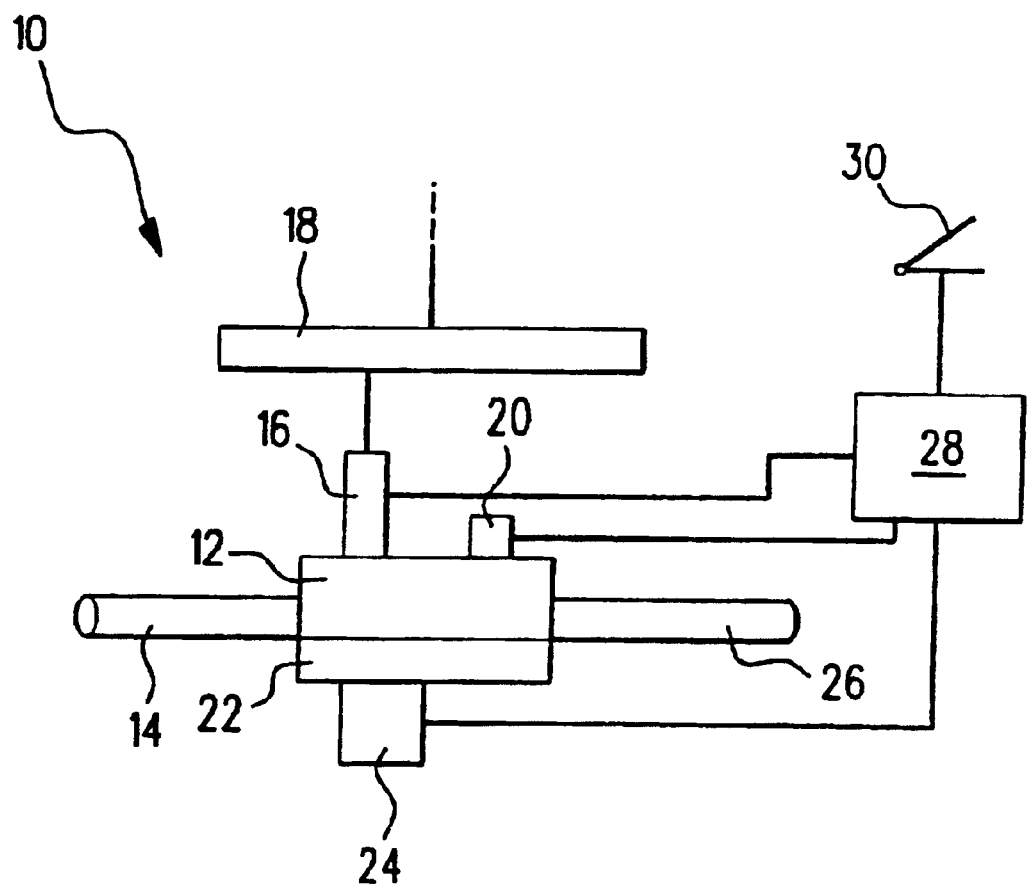
FIG. 1 is a principle schematic of an internal combustion engine having gasoline direct injection.

In FIG. 1, an internal combustion engine is identified by reference numeral 10. Typically, the engine is operated in accordance with the four-stroke principle and a work cycle therefore includes four strokes. Such an engine is, for example, used in motor vehicles. The engine includes a combustion chamber 12 to which air is supplied via an intake manifold 14. Fuel is injected into the combustion chamber 12 via a high pressure injection valve 16. This injection valve is fed from a fuel collection line 18 which is also characterized as a "rail" and in which the fuel is made available under very high pressure. The ignition of the air/fuel mixture, which is formed in the combustion chamber 12, takes place via an ignition device 20, preferably, a spark plug. A piston 22 is moved by the expansion of the combusting air/fuel mixture. The operating state of the internal combustion engine 10, especially the position of the piston 22, is detected by a sensor 24. The hot combustion exhaust gases are conducted away via an exhaust-gas pipe 26.

The internal combustion engine 10 includes a control apparatus (open loop and/or closed loop) 28 to which the power commands of a user are imparted via an accelerator pedal 30. Furthermore, the control apparatus (open loop and/or closed loop) 28 receives signals from the sensor 24. At the output end, the apparatus 28 is, inter alia, connected to the injection valve 16 and the ignition device 20.

The fuel is generally injected very early, that is, already at the start of the downward movement of the piston 22 in the induction phase of the internal combustion engine 10 in order to obtain a homogenization, that is, a mixing of the fuel, which is injected into the combustion chamber 12 by the injection valve 16, with the air inducted through the intake manifold 14 as uniformly as possible. The relevant angle of the crankshaft (not shown) of the internal combustion engine 10 is detected by the sensor 24 and a corresponding signal is transmitted to the control apparatus (open loop and/or closed loop) 28.

A relatively low pressure (in general, at most approximately 1 bar) is present in the combustion chamber 12 during this phase. For this reason, the danger is present that the fuel, which is injected by the injection valve 16 under high pressure into the combustion chamber 12, impinges against the wall (not shown) of the combustion chamber 12, which lies opposite to the injection valve 16, or impinges on the upper side of the piston 22 and adheres there. A fuel layer on the wall or on the piston 22 can be vaporized only with difficulty and does not participate or at least does not participate in the desired manner in the combustion in the combustion chamber 12 which increases the fuel consumption and deteriorates the emission performance. The problem of the deposit of the fuel on a wall of the combustion chamber 12 is especially significant when the wall of the combustion chamber 12 is cold. In this case, the cold-start performance of the internal combustion engine 10 is therefore affected.

The injection valve 16 is driven by the control apparatus (open loop and/or closed loop) 28 so that it opens and closes pulse-like in order to avoid that such a deposit of fuel occurs on a wall of the combustion chamber 12. The opening time of the injection valve 16 does not exceed 0.5 ms. The fuel quantity which reaches the combustion chamber 12 during an injection pulse (that is, during an uninterrupted opening time of the injection valve 16 ) should, in the normal case, not exceed approximately 5 mm$^3$. The penetration depth of the fuel in the combustion chamber 12 drops with a pulse duration of this kind and a fuel quantity injected in this manner per pulse so that the fuel no longer impinges against the wall of the combustion chamber which lies opposite to the injection valve 16.

The depth of penetration of the fuel in the combustion chamber 12 is reduced by the discontinuous injection of the fuel into the combustion chamber 12, that is, by the injection of fuel comprising a sequence of individual injection pulses. The problem that the fuel deposits on the wall of the combustion chamber lying opposite to the injection valve 16 is effectively reduced.

In this way, it is ensured that the fuel, which is injected into the combustion chamber 12, is present as completely as possible as an air/fuel mixture in the combustion chamber 12 and therefore an optimal combustion of the injected fuel takes place. This reduces the fuel consumption and improves the emission performance, especially the hydrocarbon or soot emissions. The reduced depth of penetration of the fuel into the combustion chamber 12 has especially favorable effects when the wall of the combustion chamber 12 is cold, that is, for the cold start of the internal combustion engine 10. In such cases too, it can be ensured with the method of the invention that an ignitable air/fuel mixture is present in the combustion chamber 12 of the internal combustion engine 10.

In the diagrams shown in FIGS. 2 to 7, different embodiments of possible pulse sequences for the fuel injection into the combustion chamber 12 are shown. The individual injection pulses are identified by reference numeral 32; whereas, the pauses between two injection pulses are identified by reference numeral 34. The total injection of a work cycle of the internal combustion engine is identified by 36.

Figure 2:
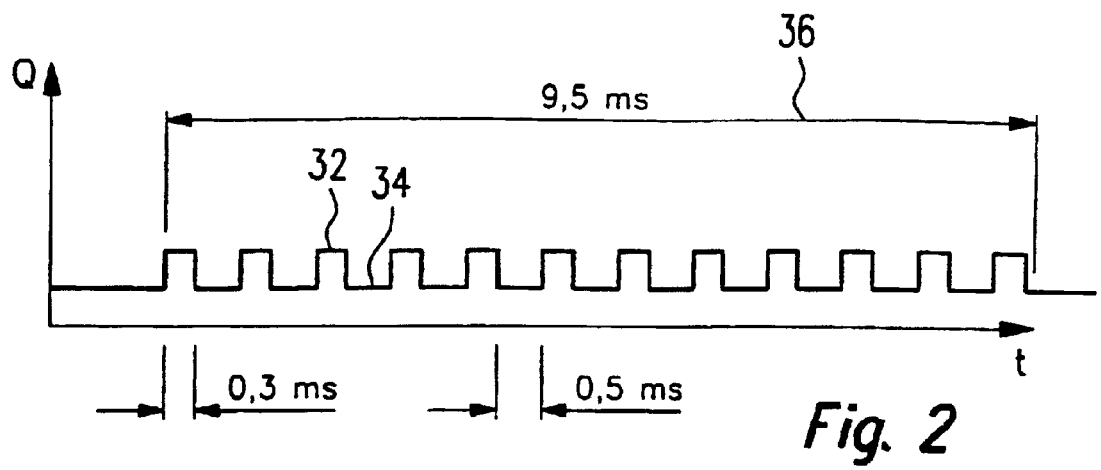
FIG. 2 is a diagram of a first embodiment of a method for operating the internal combustion engine of FIG. 1 wherein the injected fuel quantity is shown as a function of time.

In the embodiment of a pulse sequence shown in FIG. 2, the time-dependent spacings 34 between two pulses 32 are equally long over the duration of an injection and amount approximately to 0.5 ms. The duration of an injection pulse 32 itself is approximately 0.3 ms. In the embodiment shown in FIG. 2, the duration of the total injection 36 is approximately 9.5 ms. For an injection quantity of 5 mm$^3$ per injection pulse 32, a fuel quantity of approximately 60 mm$^3$ is injected during the injection 36 shown in FIG. 2. For an rpm of 4,000 revolutions per minute, the time window, which is available for the injection, is approximately 11 ms long. The fuel quantity of 60 mm$^3$, which is to be injected at full load, can therefore be introduced without difficulty into the combustion chamber 12 of the internal combustion engine 10.

Figure 3:
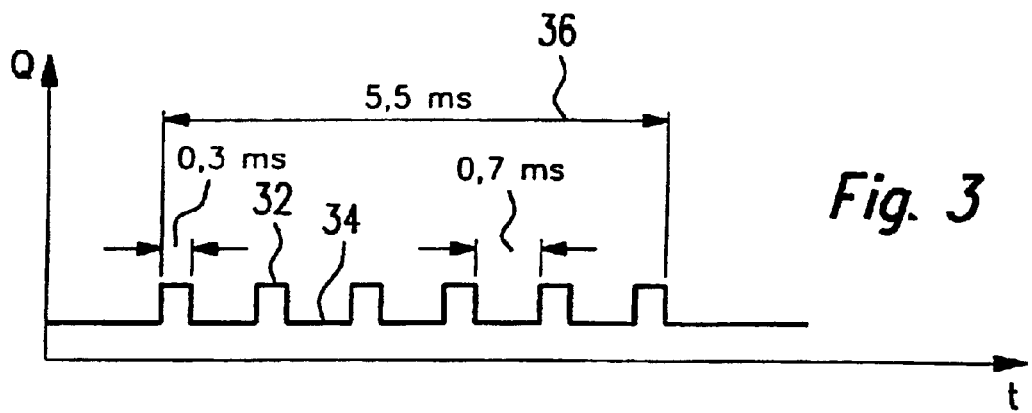
FIG. 3 is a diagram similar to FIG. 2 of a second embodiment of a method for operating the internal combustion engine of FIG. 1.

The embodiment shown in FIG. 3 is for an operating state of the internal combustion engine 10 wherein the engine operates at an rpm of 5,000 revolutions per minute in the part load range. This means that, for an injection 36, a fuel quantity of approximately 30 mm$^3$ should be injected. The time window, which is available for an injection 36, is approximately 9 ms long. With the six injection pulses 32 of 0.3 ms duration and pauses 34 of 0.7 ms duration, a total duration of the injection results of 5.5 seconds for an injection quantity of 30 mm$^3$ corresponding to the part load.

If, for example, a larger quantity of fuel is to be injected into the combustion chamber 12 of the internal combustion engine 10, for example, at a higher rpm and full load, the pauses between the injection pulses can be shortened in an embodiment (not shown). For an rpm of the engine 10 of, for example, 6,000 rpm, a time window is available for the injection of approximately 7.5 ms. In order to inject an injection quantity of 60 mm$^3$, 12 injection pulses are sufficient which each inject 5 mm$^3$ of fuel and which each are spaced in time from each other by 0.33 ms. The total duration of the injection resulting herefrom of 7.3 ms lies clearly within the time window which is available.

Figure 4:
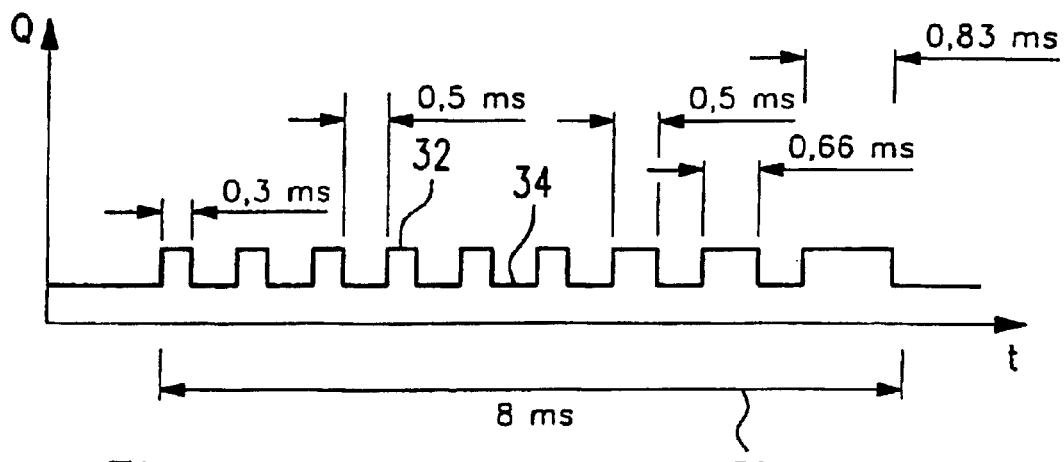
FIG. 4 is a diagram similar to FIG. 2 of a third embodiment of a method for operating the internal combustion engine of FIG. 1.
Figure 5:
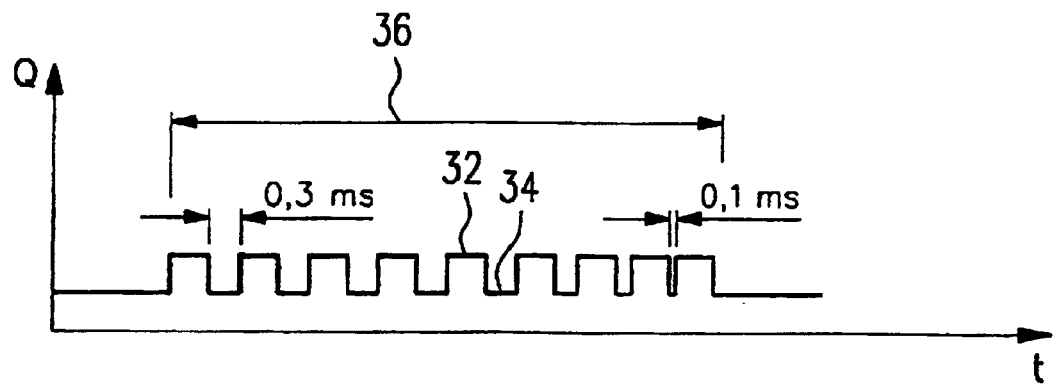
FIG. 5 is a diagram similar to FIG. 2 of a fourth embodiment of a method for operating the internal combustion engine of FIG. 1.

In the embodiment of a pulse sequence shown in FIG. 4, the duration of the injection pulses 32 lengthens toward the end of the total injection 36. A procedure of this kind is, for example, appropriate when the injection takes place not only during the induction phase but also during the compression phase of the engine 10. Since the pressure in the combustion chamber 12 increases during the compression phase, the penetration depth drops with constant injection component quantity or, for the same depth of penetration, a larger injection component quantity per injection pulse 32 can be selected. In the embodiment shown, the duration of the total injection 36 is approximately 8 ms. The duration of an injection pulse 32 increases toward the end of the injection from 0.3 ms to 0.5 and then further to 0.66 and finally to 0.83 ms. It is also possible to increase the injection quantity toward the end of the injection 36 in that the duration of the pauses 34 between two injection pulses 32 is reduced. Such an embodiment is shown in FIG. 5.

Figure 6:
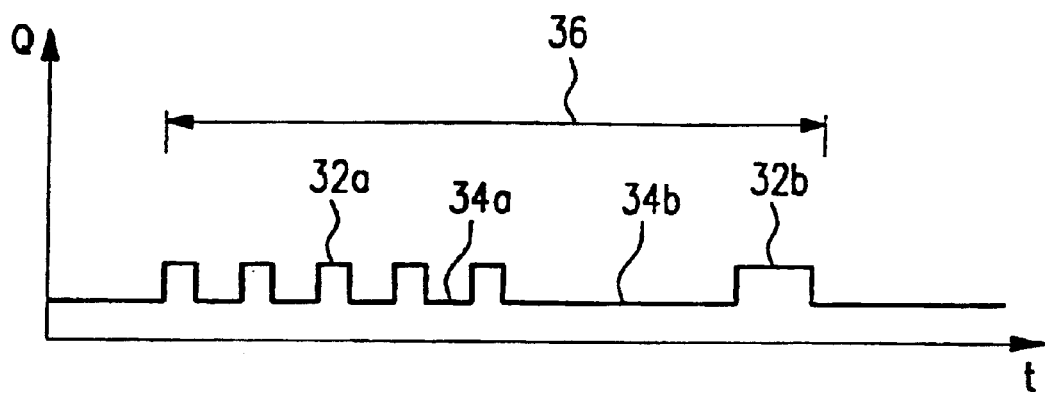
FIG. 6 is a diagram similar to FIG. 2 of a fifth embodiment of a method for operating the internal combustion engine of FIG. 1; and, FIG. 7 is a diagram similar to FIG. 2 of a sixth embodiment of a method for operating the internal combustion engine of FIG. 1.

If a stratification of a stoichiometric mixture cloud and a homogeneous lean mixture is to be generated in the combustion chamber 12 of the engine 10, then the injection strategy shown in FIG. 6 is appropriate as follows.

An individual longer injection pulse 32b after a longer pause 34b takes place after a series of pulses 32a having uniform spacings 34a. With the starting pulse series 32a, a homogeneous lean mixture is generated in the combustion chamber 12. For a piston 22 close to top dead center during the compression phase of the engine 10, so much fuel is injected into this mixture via the injection pulse 32b that a stoichiometric mixture cloud arises within the lean mixture. This mode of operation affords the advantage that also extremely lean homogeneous basic mixtures can be combusted completely because a significant part of the volume was combusted stoichiometrically within the combustion chamber 12 and therefore the homogeneous lean surrounding was heated and compressed. The advantage of the injection strategy shown in FIG. 6 is in the still further reduced fuel consumption. An injection during the compression phase of the engine 10 further affords the advantage that the probability of knocking of the engine 10 is reduced.

Figure 7:
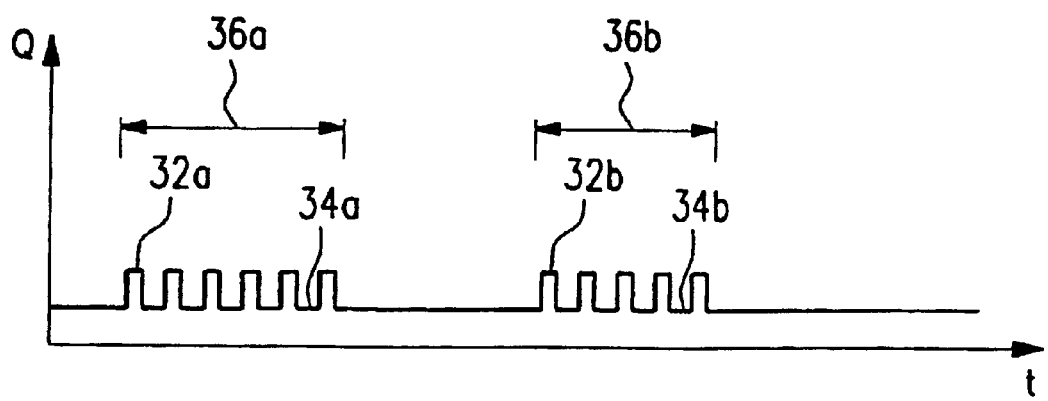

The embodiment shown in FIG. 7 goes in the same direction wherein two injections 36a and 36b take place within a work cycle of the engine 10. These injections are, in turn, comprised of individual injection pulses 32a and 32b with pauses 34a and 34b lying therebetween.

What is claimed is:

1. A method for operating an internal combustion engine including an internal combustion engine of a motor vehicle, the method comprising the steps of:

injecting gasoline from an injection valve directly into a combustion chamber of said engine with at least one injection per work cycle;

injecting the gasoline of said one injection during an intake stroke as a plurality of short injection pulses spaced in time one from the other; and, causing at least one of said plurality of short injection pulses to be so short that gasoline injected into said combustion chamber does not impinge on the wall of said combustion chamber lying opposite said injection valve.

2. The method of claim 1, wherein the gasoline quantity, which arrives in the combustion chamber with said one injection, is adjusted at least also via the duration of the individual short injection pulses.

3. The method of claim 1, wherein the gasoline quantity, which arrives in the combustion chamber during an injection, is adjusted at least also by the number of the individual short injection pulses.

4. The method of claim 1, wherein the injection pulses are uniformly distributed over the entire duration of an injection.

5. The method of claim 1, wherein the duration of said short injection pulses does not change over the entire duration of said one injection.

6. The method of claim 1, wherein the time-dependent spacing between two short injection pulses changes over the duration of said one injection.

7. The method of claim 1, wherein the duration of one of said short injection pulses changes over the entire duration of an injection and preferably increases.

8. The method of claim 1, wherein, at the end of an injection, an individual one of said short injection pulses takes place which takes longer than the previous short injection pulses of said one injection.

9. The method of claim 1, wherein approximately 5 mm$^3$ of gasoline is injected per short injection pulse and/or a short injection pulse takes no longer than approximately 0.5 ms.

10. The method of claim 1, wherein several gasoline injections per work cycle take place of which at least one, in turn, includes several injection pulses.

11. A computer program encoded on a computer readable medium, comprising a program suitable for carrying out a method for operating an internal combustion engine including an internal combustion engine of a motor vehicle when executed on a computer and the method including the steps of:

injecting gasoline from an injection valve directly into a combustion chamber of said engine with at least one injection per work cycle;

injecting the gasoline of said one injection during an intake stroke as a plurality of short injection pulses spaced in time one from the other; and, causing at least one of said plurality of short injection pulses to be so short that gasoline injected into said combustion chamber does not impinge on the wall of said combustion chamber lying opposite said injection valve.

12. The computer program of claim 11, wherein the computer program is stored in a memory including a flash memory.

13. A control apparatus (open loop and/or closed loop) for operating an internal combustion engine including an internal combustion engine of a motor vehicle, said control apparatus for carrying out a method for operating said internal combustion engine with said control apparatus comprising:

means for injecting gasoline from an injection valve directly into a combustion chamber of said engine with at least one injection per work cycle;

means for injecting the gasoline of said one injection during an intake stroke as a plurality of short injection pulses spaced in time one from the other; and, means for causing at least one of said plurality of short injection pulses to be so short that gasoline injected into said combustion chamber does not impinge on the wall of said combustion chamber lying opposite said injection valve.

14. The control apparatus (open loop and/or closed loop) of claim 13, wherein the apparatus is provided with a computer program for carrying out said method for operating said internal combustion engine.

15. An internal combustion engine having at least one combustion chamber and a device for injecting gasoline directly into the combustion chamber, said engine comprising a control apparatus (open loop and/or closed loop) for operating an internal combustion engine including an internal combustion engine of a motor vehicle, said control apparatus comprising means for carrying out a method for operating said internal combustion engine with said method including the steps of:

injecting gasoline from an injection valve directly into a combustion chamber of said engine with at least one injection per work cycle;

injecting the gasoline of said one injection during an intake stroke as a plurality of short injection pulses spaced in time one from the other; and, causing at least one of said plurality of short injection pulses to be so short that gasoline injected into said combustion chamber does not impinge on the wall of said combustion chamber lying opposite said injection valve.

* * * * *